UNITED STATES PATENT OFFICE.

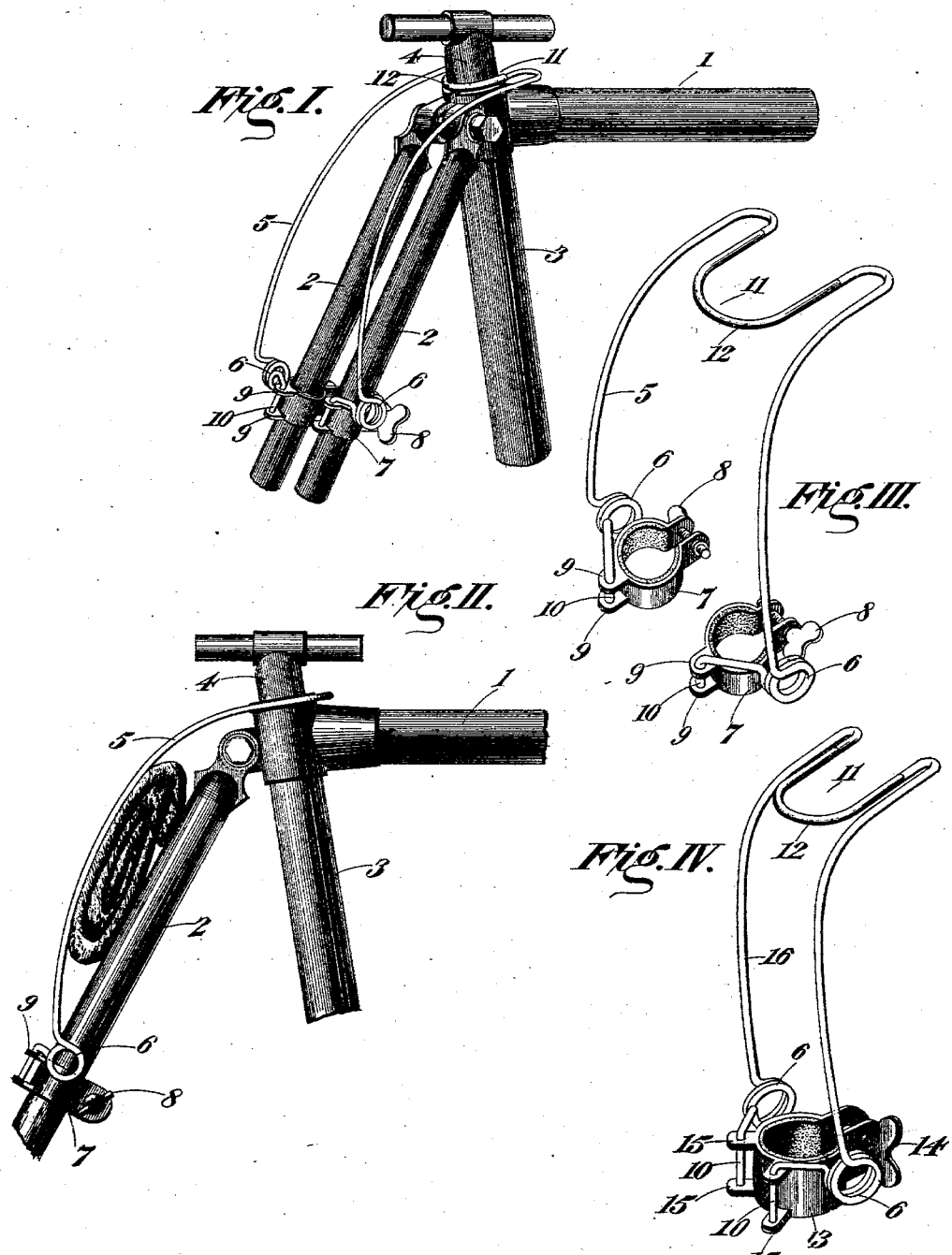

WILLIAM D. McCORMICK, OF PHILADELPHIA, PENNSYLVANIA, ASSIGNOR OF ONE-FOURTH TO CLARENCE DUNN, OF LOCK HAVEN, PENNSYLVANIA.

BICYCLE PARCEL-CARRIER.

SPECIFICATION forming part of Letters Patent No. 629,111, dated July 18, 1899.

Application filed July 2, 1897. Serial No. 643,226. (No model.)

*To all whom it may concern:*

Be it known that I, WILLIAM D. MCCORMICK, of Philadelphia, in the county of Philadelphia, State of Pennsylvania, have invented certain new and useful Improvements in Bicycle Parcel-Carriers, of which the following is a complete specification, reference being had to the accompanying drawings.

The object of my invention is to produce an improved parcel-carrier that is adapted to firmly secure to a bicycle different parcels ranging widely in their respective dimensions, that is completely automatic in operation, that is light, simple, and durable, and that may be secured to a bicycle so as to be entirely and at all times out of the way of the rider.

In the accompanying drawings, Figure I is a perspective view of a portion of a bicycle with my carrier secured thereto and in the completely-closed position. Fig. II is a side elevation of the same, showing the parcel in place. Fig. III is a perspective view of the carrier detached, looking at it from above. Fig. IV is a perspective view of a modified form of carrier.

Referring to the figures on the drawings, 1 indicates the forward reach of a bicycle-frame, 2 the rear-wheel inclined supports of the same, and 3 the frame cross-piece which in practice usually supports the saddle-post 4.

The parts above described may be of any usual and ordinary construction and are illustrated and described only for the purpose of explaining the relations of my carrier with the machine to which it is designed to be applied.

The carrier consists, essentially, of a retaining member 5, which, being secured at one end to a bicycle-frame and adapted as to its free end to swing to and from the bicycle-frame, coöperates with the latter in practice to securely hold any parcel confined between it and the frame.

I prefer to provide spring-actuated mechanism for yieldingly urging the member 5 toward the frame to which it is secured. For this purpose I prefer to make the member 5 of a single piece of stiff or spring wire, which is provided with coils 6 near its respective ends, that are secured to the bicycle-frame.

For securing the member 5 to the frame I illustrate split collars 7, provided with binding-screws 8 on one side and lugs 9 upon the other. To the lugs the ends 10 of the member when formed, as illustrated, of one piece of wire may be firmly secured.

I also prefer to provide upon the free end of the retaining member 5 a recess 11, which, being adapted to span the seat-post 4, for example, assists the retaining member in the performance of its office chiefly by preventing lateral movement of that member. To prevent rattling of the sides of the recess 11 against the side which it spans, a muffler, consisting, for example, of a section 12 of rubber tubing, upon the bend 11 may be and is preferably employed.

I prefer to locate my carrier upon the rear fork of the bicycle and under the seat, as illustrated in Fig. I, because in that position it is not only entirely out of the way, but it is inconspicuous, and if the weight of a parcel is considerable that weight is in the position described best distributed. I contemplate, however, the employment of the carrier upon the fore post, for instance, of a bicycle-frame, and in Fig. IV illustrate a carrier which, being otherwise substantially the same as the one previously described, is provided with a single split collar 13, a screw 14, and a double pair of lugs 15, to which the retaining member (indicated by 16 in this figure) is secured. The collar 13, being secured to the fore post of a bicycle, coöperates therewith to retain a package in place substantially in the manner already described.

What I claim is—

1. A bicycle parcel-carrier comprising means of securing it to some portion of a bicycle-frame, and a resilient retaining member secured thereto at one end, and tending to compel engagement between its free end and the bicycle-frame when secured thereto, and thereby to confine an article immediately between said member and the frame, said free end being provided with a recess, substantially as set forth.

2. In a bicycle parcel-carrier, the combination with a detachable collar, of a resilient retaining member secured at one end to the collar, and provided with a recess at its free end, whereby when the collar is secured to a bicycle-frame, the recess in the free end of the retaining member tends to engage the frame of the bicycle, substantially as set forth.

3. In a bicycle parcel-carrier, the combination with means for securing it to some portion of a bicycle-frame, of a retaining member secured to said means and extending therefrom, said retaining member being formed of a strand of resilient material, and being provided with actuating-coils near the respective ends of the strand, upon opposite sides of the securing means and adjacent thereto, substantially as set forth.

4. A bicycle parcel-carrier comprising means of securing it to some portion of a bicycle-frame, of lugs upon said means, a retaining member formed from a strand of resilient material, the ends of which are passed through the lugs, the side members of the strand being, respectively, bent into substantially horizontal planes immediately above the lugs, coiled adjacent to the opposite sides of the securing means, and thence extending in a curved direction, substantially as and for the purpose specified.

In testimony of all which I have hereunto subscribed my name.

WILLIAM D. McCORMICK.

Witnesses:
CHESTER A. BAKER,
JOSEPH L. ATKINS.